Figure 1:
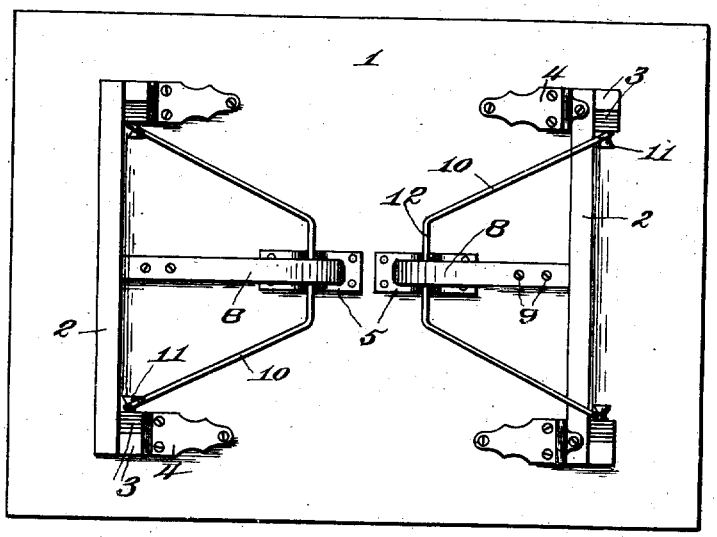

J. A. KECK.

FOLDING TABLE.

APPLICATION FILED JUNE 14, 1909.

Reissued Aug. 17, 1909.

13,013.

2 SHEETS—SHEET 1.

Witnesses:
Wm. E. Walk Jr.
Edith L. Smith

Inventor:
John A. Keck,
by
Collamer & Co., Attorneys.

ANDREW S. GRAHAM CO., PHOTO-LITHOGRAPHERS, WASHINGTON, D. C.

J. A. KECK.

FOLDING TABLE.

APPLICATION FILED JUNE 14, 1909.

Reissued Aug. 17, 1909.

13,013.

2 SHEETS—SHEET 2.

Witnesses:

Wm. E. Valk Jr.

Edith L. Smith

Inventor:

John A. Keck, by

Collamer & Co., Attorneys.

ANDREW. B. GRAHAM CO., PHOTO-LITHOGRAPHERS, WASHINGTON, D. C.

UNITED STATES PATENT OFFICE.

JOHN A. KECK, OF DECATUR, ILLINOIS.

FOLDING TABLE.

No. 13,013. Specification of Reissued Letters Patent. Reissued Aug. 17, 1909.

Original No. 862,484, dated August 6, 1907, Serial No. 370,977. Application for reissue filed June 14, 1909. Serial No. 502,187.

*To all whom it may concern:*

Be it known that I, JOHN A. KECK, a citizen of the United States, and a resident of Decatur, in the county of Macon and State of Illinois, have invented certain new and useful Improvements in Folding Tables; and my preferred manner of carrying out the invention is set forth in the following full, clear, and exact description, terminating with claims particularly specifying the novelty.

This invention relates to tables, more especially of that class which fold; and the object of the same is to produce a work table in which the legs and cleats can be folded into the smallest possible compass against the top or can be firmly held in open condition.

The invention consists in the details of construction set forth below and shown in the drawings, wherein—

Figure 2:
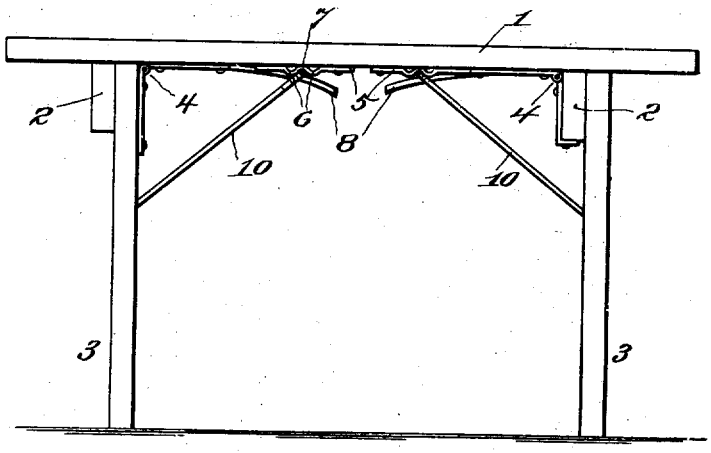
Figure 3:
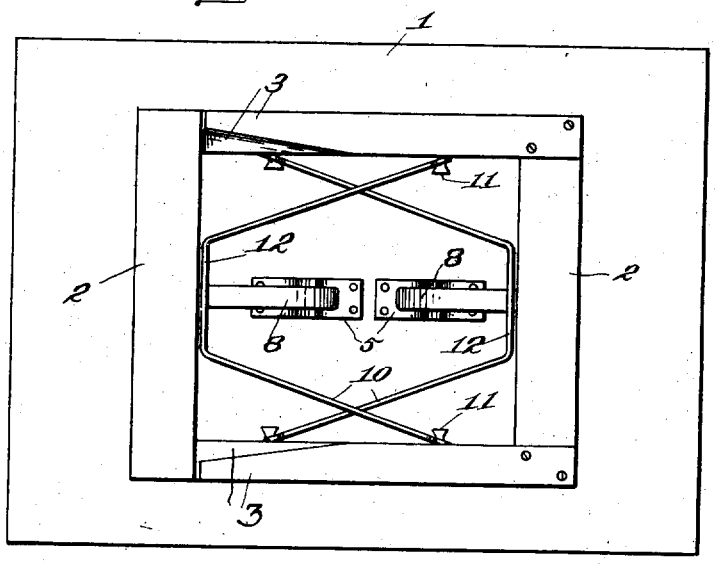
Figure 5:
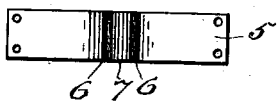
Figure 6:
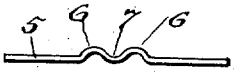
Figure 4:
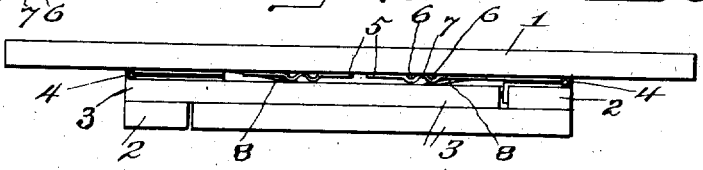

Figure 1 is a bottom plan view of the table set up; Fig. 2 is a side elevation of the same; Figs. 3 and 4 are similar views of the table with the legs folded; and Figs. 5 and 6 are bottom plan and edge views of the grooved plate.

In the drawings the numeral 1 designates the table top, and 2, 2 are cross pieces or rounds extending transversely of the top and each of them secured across the upper ends of the pair of legs 3, 3. By preference these cross pieces are rectangular as seen in Fig. 2, and one pair of legs is secured to the inside of its cross piece and the other to the outside. Whichever member is innermost (*i. e.*, toward the center of the table top) is attached thereto by any suitable form of pivotal connection which will permit the combined cross piece and its legs to turn through one quarter of a circle so that the legs may be folded upward from the position shown in Fig. 2 to that shown in Fig. 4. In the drawings I have illustrated said connection as consisting of hinges 4 whose leaves are respectively attached beneath the table top and to the inner face of the inner member. By preference the cross pieces are of the same thickness as the legs, and each leg is a trifle shorter than the distance between the axis of its pivotal connection and the inner edge of the opposite cross piece when the parts are folded, whereby in this condition each cross piece extends across the lower ends of the opposite pair of legs with sufficient distance intervening to permit folding and to admit the thickness of the lower leaf of the hinge if hinges are used.

5, 5 are grooved plates, here shown as crimped as at 6, 6 with a groove 7 between the crimps; and these plates are secured to the lower face of the table top 1.

8, 8 are spring tongues secured as at 9 to the lower face of the table top at their outer ends, with their inner ends bearing upward against the crimps and normally closing the grooves 7.

10, 10 are braces, herein shown as bails of wire, pivoted at their extremities 11, 11 to the adjacent edges of each pair of legs, and having their centers 12, 12 adapted to be passed between the spring tongues and grooved plates as best seen in Fig. 2.

In use, the table is set up as best shown in the last named view, when the braces will hold the legs in upright position with their upper ends resting squarely beneath the table top and supporting the weight of the latter. When it is desired to collapse the device or fold the legs, the inner ends of the spring tongues are bent downward, the centers of the bails are disengaged from the grooves in the plates and moved inward toward and past each other, and the pairs of legs are turned inward on their pivotal connections or hinges as will be understood. This motion folds one pair of legs upward practically against the lower face of the table top as shown in Fig. 4, with their cross piece beneath them, and it brings the other cross piece practically against the lower face of the table top across the outer extremities of the first pair of legs and with its own pair of legs beneath them and their extremities adjacent the cross piece first mentioned. If the pivotal connection is properly located and the cross pieces and legs are of the same thickness, this condenses all parts into the most limited space possible and folds them tight against each other and against the table top, inclosing the braces and plates within them as best seen in Fig. 3.

The parts are of any desired sizes, materials, and proportions, and such changes in details may be made as do not involve a departure from the principle of my invention.

What is claimed as new is:

1. A folding table comprising a top, two cross pieces, two pairs of legs of which each pair is secured to relatively the same side of one of the cross pieces, pivotal connections between the top and the innermost pair of legs, other pivotal connections between the top and the innermost cross piece, the connections being so located that when folded the pairs of legs lie against each other and each cross piece across the ends of the legs of the opposite pair, and means for bracing the legs when the table is set up.

2. A folding table comprising a top, two cross pieces, two pairs of legs of which each pair is secured to relatively the same side of one of the cross pieces, pivotal connections between the top and the innermost pair of legs, and other pivotal connections between the top and the innermost cross piece, the connections being so located that when folded the pairs of legs lie against each other and each cross piece across the ends of the legs of the opposite pair; combined with a bail pivoted at its extremities to the adjacent edges of each pair of legs and of such length that its center stands within the cross piece of the opposite pair when the device is folded, and catches engaging the centers of said bails when the table is set up.

3. A folding table comprising a top, two cross pieces, two pairs of legs of which each pair is secured to relatively the same side of one of the cross pieces, the latter being of the same thickness as the legs, pivotal connections betwen the top and the innermost pair of legs, other pivotal connections between the top and the innermost cross piece, the connections being so located that when folded the pairs of legs lie against each other and each cross piece across the ends of the legs of the opposite pair, and means for bracing the legs when the table is set up.

4. A folding table comprising a top, two cross pieces, two pairs of legs of which each pair is secured to relatively the same side of one of the cross pieces, the latter being of the same thickness as the legs, two pairs of hinges of which the outer leaves of one pair are secured to the innermost pair of legs and the outer leaves of the other pair to the innermost cross piece and the inner leaves of all the hinges are secured to the table top, and means for bracing the legs when the table is set up.

In testimony whereof I have hereunto subscribed my signature this 3d day of June, 1909.

JOHN A. KECK.

Witnesses:
GRACE K. WILLARD,
NORA GRAHAM.